United States Patent [19]

Goss et al.

[11] Patent Number: 4,542,517
[45] Date of Patent: Sep. 17, 1985

[54] DIGITAL SERIAL INTERFACE WITH ENCODE LOGIC FOR TRANSMISSION

[75] Inventors: Gary J. Goss, Acton; Robert G. H. Moles, Sudbury; Randall D. Hinrichs, Belmont; Thomas O. Holtey, Newton, all of Mass.

[73] Assignee: Honeywell Information Systems Inc., Waltham, Mass.

[21] Appl. No.: 304,755

[22] Filed: Sep. 23, 1981

[51] Int. Cl.⁴ ............................................. H03K 13/02
[52] U.S. Cl. ........................................ 375/36; 375/19; 340/347 DD
[58] Field of Search .................... 375/17, 19, 20, 25, 375/36, 110, 18, 59, 34; 360/40, 43, 48; 340/347 DD; 361/246

[56] References Cited

U.S. PATENT DOCUMENTS

| | | | |
|---|---|---|---|
| 2,700,696 | 1/1955 | Barker | 375/19 |
| 3,300,774 | 1/1967 | Chatelon et al. | 375/34 |
| 3,671,959 | 6/1972 | Amano | 375/17 |
| 3,783,383 | 1/1974 | Forster et al. | 375/59 |
| 3,828,346 | 8/1974 | Forster et al. | 340/347 DD |
| 4,352,095 | 9/1982 | Assard | 340/347 DD |

Primary Examiner—Robert L. Griffin
Assistant Examiner—Stephen Chin
Attorney, Agent, or Firm—Nicholas Prasinos

[57] ABSTRACT

An apparatus for encoding data for serial transmission wherein only logic ZEROs are transmitted as electronic pulses, each pulse alternating in opposite direction and wherein logic ONEs require no pulse.

5 Claims, 5 Drawing Figures

DIGITAL SERIAL INTERFACE WITH ENCODE LOGIC FOR TRANSMISSION

RELATED APPLICATIONS FILED CONCURRENTLY WITH THIS APPLICATION

1. "Digital Serial Interface with Receive Logic" which has been amended to "Digital Apparatus for Synchronizing a Stream of Data Bits to an Internal Clock", invented by Gary J. Goss et al having U.S. Ser. No. 304,754 and filed on Sept. 23, 1981 which was abandoned and a continuation filed, having U.S. Ser. No. 568,933 and filed on Jan. 10, 1984.

2. "Digital Serial Interface with Decode Logic" which has been amended to "Digital Decode Logic for Converting Successive Binary ZERO Pulses Having Opposite Polarity to Binary ZERO Pulses Having the Same Polarity" invented by Gary J. Goss et al having U.S. Ser. No. 304,756 and filed on Sept. 23, 1981.

BACKGROUND OF THE INVENTION

1. Field of the Invention

This invention relates generally to computer communications systems, and more particularly to a serial communication interface for encoding data for transmission on a communications channel.

2. General Description of the Prior Art

In order to transmit and receive information between two places, it is necessary to have a transmitter, a communications channel, and a receiver. The transmitter must be capable of converting information generated by humans or machines into electronic signals that will travel over a communications channel. The channel conveys the signals to the receiver with minimum distortion. The receiver then reconverts the signals back to the original form. In computer communications, bits of binary data are commonly transferred between electronic devices by changes in current or voltage. Data may be transferred in "serial", over a single line, or in "parallel", over several lines at once. The transfers may be "synchronous", in which the exact departure or arrival time of each bit of information is predictable, or they may be "asynchronous", in which case the data is transferred at non-uniform rates. Data may also be transferred in parallel transmission where each bit of the set of bits that represent a character has its own wire. In synchronous mode, an additional wire called the "strobe" or "clock" lead notifies the receiver unit that all of the bits are present on their respective wires so that the voltages on the wires can be sampled. Computers utilize both these modes of transmission. Where data is to be transferred between devices that are in close physical proximity, parallel transmission and reception is generally utilized. However, as the distance between these devices increases, the multiple wires not only become more costly, but the complexity of the line drivers and receivers increases, due to the increased difficulty of properly driving and receiving signals on long wires. Serial transmission is, therefore, generally used where the cost of communications medium is high enough to justify a relatively complex transmitter and receiver system that will serialize the bits that represent the character, send them over the single line, and reassemble them in parallel form at the reception end. For these reasons in most data communications applications, serial transmission is preferable to parallel transmission.

Some computer devices operate in an analog environment where alternating current signals convey information. However, most computers that are used today are digital computers which require that direct current (d.c.) pulses or a.c. signals converted into d.c. pulses be used to represent data. D.c. pulses form an on-off or mark-space configuration. (By convention, the idle state wherein current is flowing is called the "ONE" state or "mark" condition; and the lack of current state is called the "ZERO" state, or "space" condition.) When data transmission is accomplished with d.c. signals, the transmission line can terminate directly in an adapter which interfaces it with the sending or receiving terminal. On the other hand, when an a.c. signalling technique such as frequency shift keying is used, the d.c. signal from the transmitting adapter is converted into a.c. in a modulator and reconverted into d.c. in a demodulator on the receiving end of the circuit. These "modulating" and "demodulating" circuits are frequently combined into a single circuit called a "modem". Modems provide the necessary compatability between data processing equipment and communications facilities. They come in a variety of forms and may be inherently simplex, inherently half duplex, or full duplex. Data sets are modems with additional control capabilities such as those required for automatic dialing. With this type of equipment it is possible for computers to communicate with each other, utilizing commercial communications channels. However, a computer system must also communicate with various hardware devices in its own system. For example, a processor must communicate with input devices such as card readers, tape drives, disk drives, terminals, teleprinters, etc. More often than not, these devices are located in remote locations. For example, a factory data collection terminal for collecting production and inventory information may be located in a building housing manufacturing facilities; whereas the central processor may be located in a building housing the office facilities. Where these distances are generally no more than 1500–1800 feet, it has been possible to transfer information within the various hardware of the system and to the data sets by a synchronous transmission utilizing data (1) bit-oriented (pulse) protocol or (2) character-oriented protocol. The terms "bit-oriented" and "character-oriented" refer not to interfaces but rather to the protocol used to control the interface (link-level protocol). In a character-oriented protocol, all data must be framed into "characters" and certain character codes (control characters) are assigned special meaning to control the dialog over the interface. With this protocol, it is not possible to send an arbitrary sequence of bits (pure binary data) over the channel, rather data must first be encoded into an interchange code such as ASCII or EBCDIC (IBM) in order to be transmitted. In a bit-oriented protocol, the data is modified by the interface hardware as it is transmitted so that certain bit sequences cannot occur. In SDLC/HDLC, the modification in such that no more than five ONE bits occur in sequence. Furthermore, the data is transmitted in blocks of arbitrary length called frames and the interface hardware precedes (and terminates) each frame with a unique bit sequence (i.e., one that cannot otherwise occur due to the above-mentioned modification). In SDLC/HDLC this sequence, called a Flag, consists of six ONE bits preceded and followed by one ZERO bit. Note that this eight-bit sequence is always interpreted as a Flag, no matter where it occurs. In this type of protocol, the link-level control information immediately follows the Flag and is in turn followed by the actual data (if any). With a bit-oriented protocol, the data is always sent in synchronous mode, never in asynchronous (start-stop) mode.

With a bit-oriented protocol, the information transferred between the computer and data set is a single bit. This means that when the computer wants to send a character, it must break that character down into the individual bits and output those bits plus the start and stop bits to the interface at the proper time interval; e.g., a bit every 22 milliseconds. From the interface, the bit is sent to the data set where it is converted to a mark pulse if the bit was "ONE" or to a space pulse if the bit was a "ZERO". On an incoming character pulse sequence, the data set converts each pulse to a binary digit and passes the digit to the interface, which in turn passes it to the computer. The computer must be ready to receive each bit on the proper time interval; but it must also build the character from the individual bits it receives, taking care to remove the start and stop control bits.

The second type of interface used in a synchronous transmission is the character-oriented interface. Here is the interface which performs the various bit and timing manipulations. On input from the communications line to the computer, it is the interface which receives the bits from the data set, builds the character, and removes the start and stop elements. It is only after the entire character has been received that the interface presents the data to the computer. On output of the computer to the line, the computer presents the entire character to the interface. It is then the function of the interface to break down the character to the individual bits, add the start and stop bits, and transmit the bits to the data set at the proper rate. This type of interface noticeably relieves the load on the computer system. The character interface does more work than the bit interface, and, as one might expect, it is more expensive.

These interfaces function as multiplexers and allow the user to attach several devices to a computer. Without these interfaces, the user would have to allocate a channel or port for each communication device in the system. The second function these two types of interfaces have in common is their ability to convert the logic levels of the data sets to the logic levels of the computer. Finally, the third function of the interfaces is to transfer information between the computer and the data sets attached to the interface.

There are now several manufacturers selling communications interfaces on LSI (large scale integration) semiconductor chips which perform the required functions in either synchronous or asynchronous communication. One type is known as the "USART" (universal synchronous asynchronous receive and transmit) which is commercially available from manufacturers such as Intel, Texas Instruments, and others. Another type which performs the same function is known as the "SIO" and is available from Zilog. Regardless of what manufacturers manufacture the SIO or USART, there are usually 8 leads that deliver the receive characters to the computer and 8 leads upon which the computer can place characters for transmission onto the communication line. There are also additional leads which indicate that a receive character is available for reading by the computer and which indicate that a transmitter is available for the computer to load with a character for transmission. Other leads provide overrun and underrun error indications. Some interfaces also include leads that determine the number of bits per character, and whether or not parity operation is enabled. If parity is used, some chips include leads that determine whether that parity is odd or even.

These prior art systems generally function effectively in transmitting digital data within the computer system wherein the various hardware within the system are located within 1500-1800 feet. At greater distances there is significant distortion of the signal due to the DC and skin effect resistances of the line, and the significant timing transitions of the signal becoming ambiguous.

In order to communicate with hardware within the computer system without utilizing expensive equipment such as modems and data sets, the new approach utilizes coaxial cables together with analog send-receive circuitry and digital send-receive logic circuitry.

OBJECTS OF THE INVENTION

It is, therefore, a primary object of the invention to provide an improved computer communications system.

It is another object of the invention to provide an improved intra-computer or inter-computer communications systems.

It is still a further object of the invention to provide an improved digital send logic circuitry for sending digital electronic signals.

SUMMARY OF THE INVENTION

In accordance with the above and other objects of the invention, there is provided an interface having hardware circuitry for encoding the outgoing electronic signals representing data and for transmitting the data signals.

A code is utilized for transmitting or receiving data which is as follows: (1) Only ZEROs are transmitted as pulses; for ONEs, there are no pulses.

(2) Pulses alternate in opposite directions.

Circuitry is provided for transmission encoding of logic ZERO pulses which are separated in time by approximately 1/16th of a bit (data is normally transmitted and received at 1/16th of the 16 times clock).

The interface for generating the positive pulses and the strobes of positive or negative polarity responsive to the alternate positive or negative pulses representing logic ZEROs comprises basically a first positive NAND gate coupled to a first J-K flip-flop, and a second positive NAND gate coupled to the first flip-flop and including a second J-K flip-flop having its toggle coupled to the Q output terminal of the first flip-flop. In Send mode, therefore, the first positive NAND gate produces a positive output when the send data is false (ZERO) and sets the first flip-flop; whereas the second NAND gate resets the first flip-flop. Since the Q terminal of the first flip-flop is coupled to the toggle of the second flip-flop, the polarity for that pulse is generated.

DESCRIPTION OF THE PREFERRED EMBODIMENT OF THE INVENTION

General

The digital encoding scheme utilized by the invention is as follows, (a) ZEROs generate pulses; whereas ONEs do not generate pulse; (b) successive pulses are in the opposite polarity; i.e., the first pulse received or sent is positive, whereas the next pulse received or sent is negative. To illustrate this encoding scheme, let us assume that it is wished to transmit the pattern of 011101100. The first ZERO encountered at bit TIME 1 would generate a pulse. Each pulse is approxmately ¾ of a bit time wide. Since ONEs do not generate a pulse, the next ZERO encountered will generate a pulse in the opposite polarity to the preceding pulse. The next 2 ONEs generate no pulse, but then we have 2 successive ZEROs, wherein the first ZERO generates a pulse in the opposite polarity to the preceding pulse and the next ZERO generates a pulse in the opposite polarity.

Figure 1:
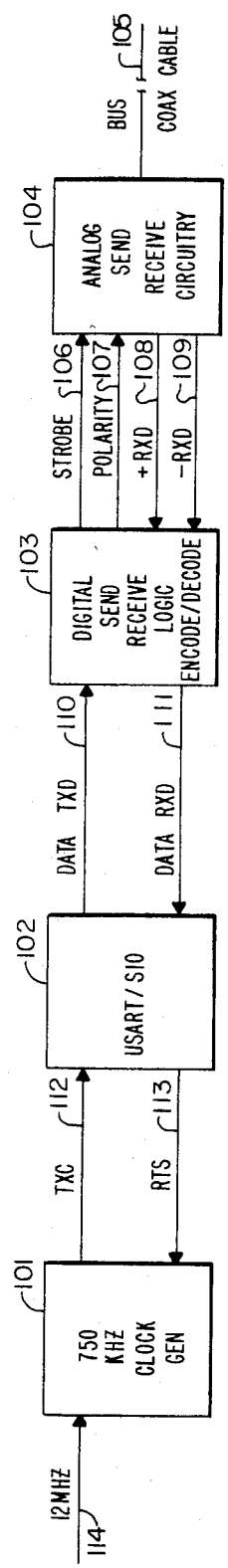
FIG. 1 is a schematic block diagram of the data communications interface.

Referring now to FIG. 1, the digital interface signals between the digital send-receive logic 103 and the analog send-receive logic circuitry 104 consist of four signals. Two signals are utilized to send and two signals are utilized to receive. One signal for sending is utilized for controlling the direction of polarity indication 107; whereas the other signal for sending is for pulse or strobe 106. In the send mode, the digital send-receive logic 103 generates a pulse every time that a ZERO is to be sent. Since digital pulses can be sent in one polarity only, it is necessary to have a direction signal on the line 107 indicating the polarity of the output pulse to be generated. Each time a ZERO is sent, the polarity signal reverses. Accordingly, when the strobe and polarity signals are received by the analog send-receive circuitry 104, the analog circuitry generates a positive pulse when the polarity signal is plus and a negative pulse when the polarity signal is minus. This generated analog signal can then be placed on the coaxial cable bus 105.

In the receive mode there are also two signals. One signal 108 carries the plus data signal RXD, whereas the next signal 109 carries the minus data signal −RXD. If there is a positive pulse being received by the digital send-receive logic 103, then a pulse occurs on the plus RXD 108. If there is a negative pulse being received by the digital send-receive logic 103, then a negative pulse occurs on the minus RXD line 109.

The USART/SIO 102 is a Zilog SIO type. It transmits and receives digital data on the TXD line 110 and RXD line 111, respectively. It also receives clock pulses from the 750 kilohertz clock generator 101 and on TXC line 112. The 750 kilohertz clock generator is nothing more than a binary counter which receives 12 megahertz clock pulses at its input 114. The binary clock counter is four-stage, which in effect divides a 12 megahertz frequency by 16, giving a 750 kilohertz frequency. This is readily apparent when it is observed that the 12,000 kilohertz frequency (12 megahertz) is divided to 6,000 kilohertz at the first stage, to 3,000 kilohertz in the second stage, to 1,500 kilohertz in the third stage and finally to 750 kilohertz in the fourth stage (not shown). Accordingly the 750 kilohertz clock generator 101 will produce transmit clock signals TXC and receive clock signals RXC.

Figure 2:
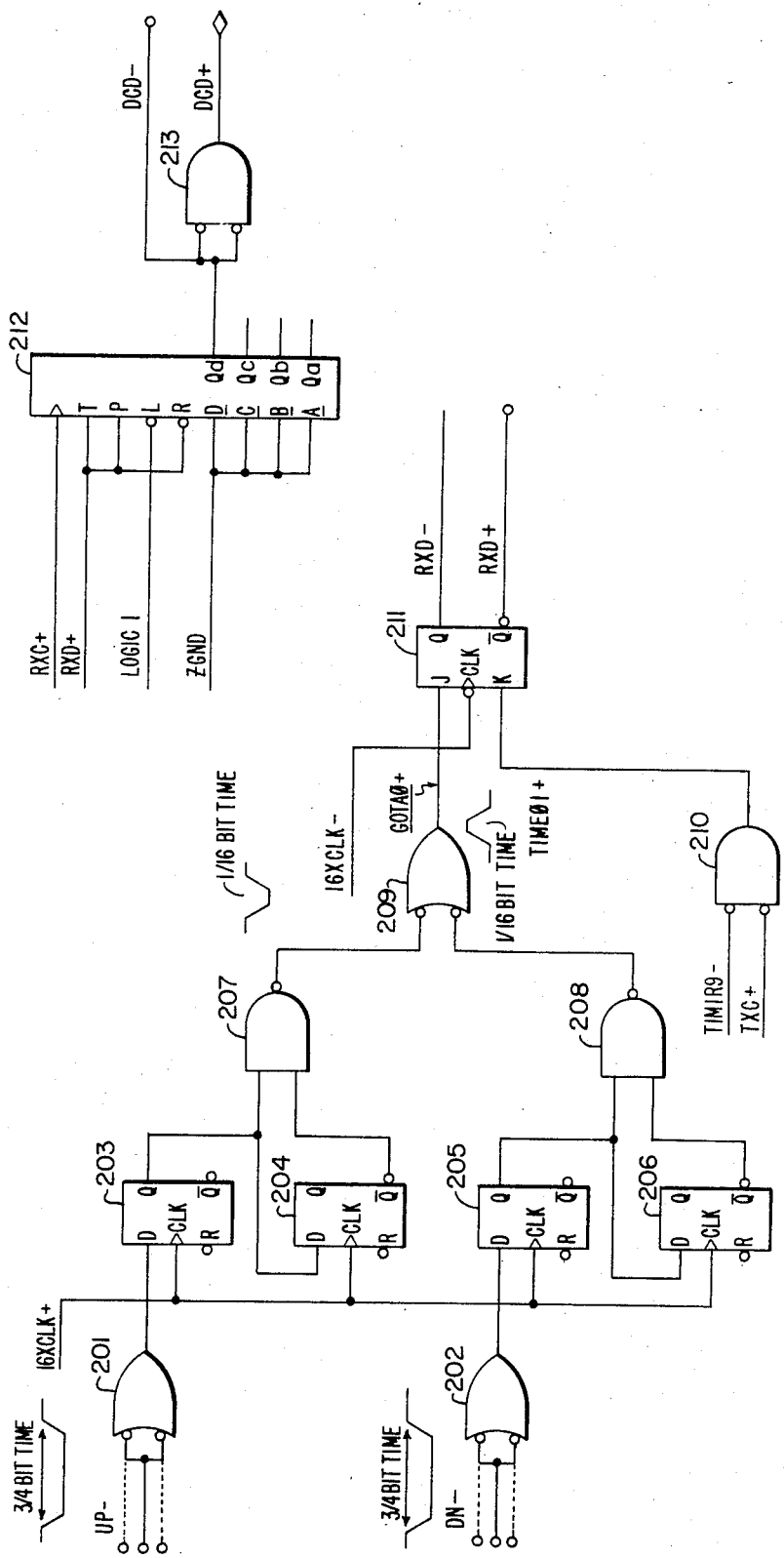
FIG. 2 is a logic block diagram of a portion of the digital receive logic of the invention.

Referring now to FIG. 2, there is shown two Texas Instruments (T.I.) negative OR/positive NAND gates 201 and 202 whose outputs are coupled to T.I.-type 74×175 quad D-type flip-flops 203 and 205, respectively. (May also be any of: 7400, 74S00 and 74LS00 type.) The D input of flip-flop 204 is coupled to the Q output of flip-flop 203. This, together with the $\overline{Q}$ output of flip-flop 204, is then fed to the T.I.-type 74X00 NAND gate 207. Flip-flops 205 and 206 and NAND gate 208 are configured in exactly the same manner. Flip-flops 203–206 are clocked at 16 times the nominal bit rate on the serial interface and together with NAND gates 207 and 208 form indentical digital differentiators. NAND gate 207 will produce a negative pulse 1/16th of a bit time in width shortly after (up to 1/16th bit time) any negative pulse (of nominal ¾ bit time width) occurs at the input of NAND 201. The same applies to the output of NAND gate 208 with respect to the input of NAND 202. The outputs of NAND gates 207 and 208 are coupled to NAND 209 which produces a positive output when either of those two is negative. This in turn is fed to the J input of flip-flop type (74X112) 211. The 74X112-type requires a negative clock input and is therefore clocked with the negation of the 16 times clock used to clock flip-flops 203–206. Therefore, its inputs are being sampled at the same instant (approximately) as those of flip-flops 203–206. Thus the flip-flop 211 will become set (indicating data equal ZERO) at the end of the 1/16th bit time interval when its input is positive due to the detection of an input pulse at the inputs of either NAND gates 201 or 202 by the appropriate digital differentiator. The K input of flip-flop 211 is fed by the output of NOR gate 210 type 74X02 which becomes positive during the second 1/16th bit time interval (TIME 01) of each bit time due to the action of the circuitry of FIG. 3 described below. Thus, flip-flop 211 reverts to (or remains in) the data equal ONE state at the end of TIME 01.

The D and $\overline{Q}$ terminals of flip-flop 204 are coupled to the input of T.I.-type 74X00 positive NAND gate 207. The D terminal and $\overline{Q}$ terminal of flip-flop 206 are also tied to the input terminals of T.I.-type 74X00 NAND gate 208. The Q terminal of flip-flop 205 is coupled to the input terminal of NAND gate 208. The output terminals of NAND gates 207 and 208, respectively, are coupled to the input terminals of T.I.-type 00 NAND gate 209. The output terminal of NAND gate 209 is coupled to the J input terminal of T.I.-type S112 dual J-K negative-edge triggered flip-flop 211. The output terminal of T.I.-type 02 positive NOR gate 210 is coupled to the K terminal of flip-flop 211. A T.I.-type S161 type synchronous 4-bit binary direct-clear counter 212 has its high order output terminal coupled to T.I.-type 02 positive NOR gate 213. Since both input terminals of negative AND gate 213 are coupled to produce a NOT result, the gate is effectively an inverter.

Figure 3:
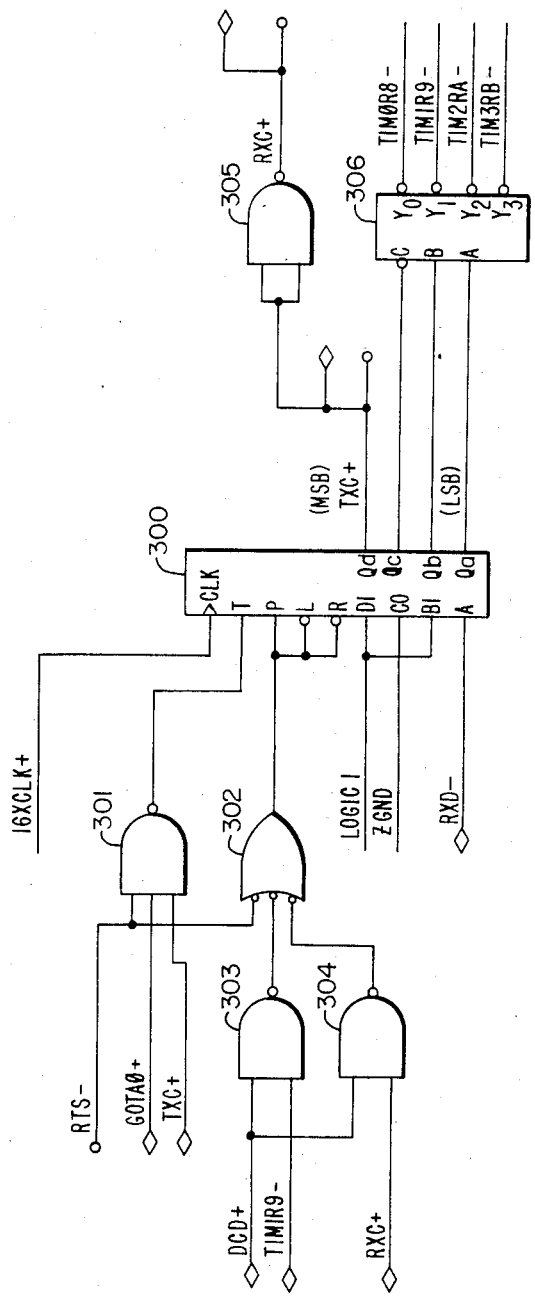
FIG. 3 is a logic block diagram of the synchronization portion of the digital receive logic.

Referring now to FIG. 3, there is shown a T.I. 74-161-type synchronous 4-bit binary direct-clear counter 300. (This counter is described in the *TTL Data Book for Design Engineers,* Second Edition, published by Texas Instruments Incorporated, as are all other components discussed in this disclosure.) Briefly the counter 300 has two enable terminals T and P. It also has load and reset terminals L, R, respectively. The data input terminals are A, B, C, D; whereas the output terminals are $Q_a$, $Q_b$, $Q_c$, and $Q_d$. $Q_d$ represents the output of the most significant bit (MSB); whereas $Q_a$ represents the output of the least significant bit (LSB). Input terminals D and B are permanently wired to produce logic ONE inputs. Input terminal C is wired to produce a logic ZERO input by being grounded. Input terminal A may be either a ONE or a ZERO according to the input signal RXD—. If the input signal RXD— is logic ZERO and the load terminal L is low, then the binary number 1010 (decimal 10) is loaded into the counter 300. On the other hand, if the same conditions prevail and the input terminal RXD— is a binary ONE, then the binary number 1011 (decimal 11) is loaded into the counter 300. As will be described later, this counter can be used to synchronize the clock pulses with the data pulses by either permitting the clock time to shrink, expand or stay the same, in accordance with the number loaded in the counter.

T.I.-type 10 triple 3-input positive NAND gate 301 has its output coupled to one of the enabling terminals T of counter 300. The other enabling terminal P of counter 300 is coupled to the output of a T.I.-type 10 three-input positive NAND gate 302 which has been shown with NOT inputs to form a three-input negative OR gate. Additionally this signal is also coupled to the load terminal L of counter 300. One input terminal of negative OR gate 302 is coupled to an input terminal of positive NAND gate 301. Another input terminal of negative OR gate 302 is coupled to the output terminal of T.I.-type 00 positive NAND gate 303. Still a third input terminal of negative OR gate 302 is coupled to the output terminal of T.I.-type 00 positive NAND gate 304. The $Q_d$ terminal of counter 300 is coupled to the inputs of T.I.-type 00 positive NAND gate 305. The $Q_c$ terminal of counter 300 is coupled to the C input terminal of T.I.-type 74X139 dual 2-to-4 line decoder 306. The $Q_a$ and $Q_b$ output terminals of counter 300 are coupled to the A and B terminals, respectively, of decoder 306.

One input of each of NAND gates 301 and 302 is connected to the negative true Request to Send (RTS—). This signal emanates from the Zilog-SIO and will be caused to be low during Send operation and high during Receive operation. When RTS— is low during Send operation, the outputs of NANDs 301 and 302 remain high with the result that the T, P and L inputs to counter 300 are all high which inhibits parallel loading and enables counting. The clock input to counter 300 is fed by the same 16 times clock described earlier and with the T, P and L inputs high, the counter simply counts continuously producing output TXC+ at its $Q_d$ (MSB) terminal that is 1/16th the rate of the clock or one times the bit rate. This signal is then sent to the SIO which will output serial data in synchronism with it. Signal TXC+ is inverted by gate 305 to produce signal RXC+ which is also sent to the SIO and whose positive edge samples data into the SIO in Receive mode. Counter 300 also serves to subdivide each bit time into 16 intervals named TIME 00 through TIME 15 starting from the negative edge of the most significant output (TXC+). Decoder 306 type 74X139 serves to partially decode eight of these states. It is wired such that its A and B decode inputs are connected to the least significant two bits ($Q_a$ and $Q_b$) of counter 300 while its inhibit (C) input is connected to the next most significant bit output of counter 300 ($Q_c$). The decoder 306 is thus inhibited during TIME 04 thru TIME 07 and during TIME 12 through TIME 15 and enabled otherwise. Since it is operating to decode the least significant two bits of counter 300, its $Y_0$ output (TIM0R8—) will go low during TIME 00 or during TIME 08, its $Y_1$ output (TIM1RG—) is low during TIME 01 or TIME 09, its $Y_2$ output (TIM2RA—) goes low during TIME 02 or TIME 10 and its $Y_3$ output (TIM3RB—) goes low during TIME 03 or TIME 11. These outputs can then be combined with the most significant output (TXV+/RXC+) of counter 300 to fully decode any of the eight states TIME 00 through TIME 03 and TIME 08 through TIME 11 of the sixteen states of counter 300. In this way NOR gate 210 of FIG. 2 described earlier is wired so that its output goes high during TIME 01.

Counter 212 (type 74X161) is used to detect the presence/absence of received data. Counter 212 is clocked by RXC—. In the absence of any received data, the RXD+ signal which is connected to the T, P and R inputs of counter 212 will be high. This will cause the counter to count. The most significant bit of counter 212 is inverted by gate 213 (this is shown as a type 74X02 NOR but could be any inverting gate) to produce the signal DCD+. When counter 212 reaches a count of eight (or happens to be initially in a state between eight and fifteen), the signal DCD+ goes low which, as it will be shown later, stops the bit clock counter 300 in TIME 09. Both counters remain in this state until the first ZERO bit is received. At this time, RXD+ will go low as described earlier and will cause counter 212 to be cleared by driving its R input low. This causes its most significant bit output to become low and, via gate 213, signal DCD+ to become high. This will enable counter 300 described below. As long as no more than seven consecutive one bits are detected, these conditions will prevail; i.e., the counter will count ONE bits but be reset by each ZERO bit so that signal DCD+ remains high. At the end of the transmission, the line goes idle (no data pulses); when eight consecutive ones occur, signal DCD+ once again goes low again stopping counter 300.

Figure 4:
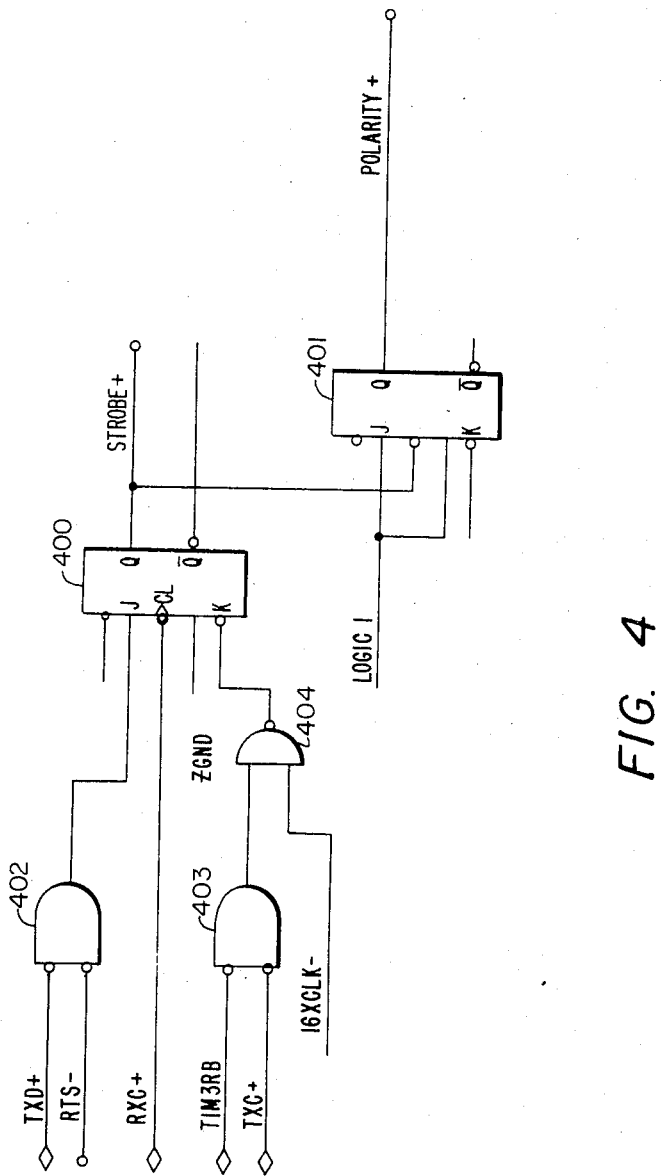
FIG. 4 is a logic block diagram of the digital transmit logic.

Referring now to FIG. 4, in Send mode, the negative edge of the clock TXC+ is the active edge; for the SIO, the data will be valid within 300 nanoseconds after the negative edge of TXC. Gate 402 produces a positive output whenever the Send data output from SIO is false (ZERO) and RTS— is low (Send mode). This output is connected to the J input of negative edge triggered flip-flop 400 type 74X112, and the input is sampled by the falling edge of signal RXC at the clock input. The fall of RXC being coincident with the rise of TXC means that the data is sampled at the ½ bit time after it has become valid (667 nanoseconds from fall of TXC at a 750 kilobit rate).

Gate 403 produces a positive output during TIME 03 (TIME 03 or TIME 11 and TXC being low). This output is ANDed with the negation of 16 times clock by gate 404 to eliminate any decoding spikes and its output, which goes low during the second half of TIME 03, resets flip-flop 400. Thus flip-flop 400 is set for approximately 11½ sixteenths of a bit time (from the beginning of a TIME 08 until half way through the subsequent TIME 03) for every ZERO bit that is transmitted.

The Q output of flip-flop 400 (strobe) is connected to the clock input of the negative-edge triggered flip-flop 401 type 74X112 whose J and K inputs are always high, thus its output reverses state on every falling edge of the STROBE signal and is used as the polarity control.

Now referring to FIG. 4, a T.I.-type LS112 dual J-K negative-edge triggered flip-flop 400 has its J input terminal coupled to the output of T.I.-type 02 positive NAND gate 402. The K input terminal of flip-flop 400 is coupled to the output of NAND gate 404. One of the inputs of NAND gate 404 is coupled to the output of T.I.-type 02 positive NOR gate 403.

Referring once again to FIGS. 2-5, the operation of the invention will now be discussed in greater detail. On FIG. 2, flips-flops 203, 204, 205 and 206, together with their input and output gates 201, 202, 207, 208 and 209, form a logical differentiating circuit and generate the pulse GOTA0 at the output of positive/negative OR gate 209. The GOTA0 pulse is generated each time an up or down data pulse is received on negative OR gates 201, 202, respectively. Flip-flops 203-206 are clocked at 16 times clock or 12 megahertz. The output terminal of gates 201, 202, respectively, goes high when a pulse UP or DN (both negative and approximately ¾ths bit time wide) is received at the input terminals of gates 201, 202, respectively. In accordance with a truth table of flip-flops 203-206 shown on page 7.253 of the *TTL Data Book for Design Engineers*, Second Edition, 1976, by Texas Instruments Incorporated, for T.I. 175-type flip-flops 203-206 when the D input terminal is high and the clear R input terminal is also high, the Q terminal of flip-flop 203 will be high and the $\bar{Q}$ terminal of flip-flop 203 will be low when the clock terminal switches to high. Accordingly referring again to FIG. 2, with a positive level UP, DN on the input terminals of either NAND gate 201, 202, the input terminal of flip-flop 203, 205 will be low. Accordingly on the rising pulse of the clock terminal of flip-flop 203, 205, the Q output terminal will be low and the $\bar{Q}$ output terminal will be high. The low output from the Q terminal of flip-flop 203, 205 is applied to one input of NAND gate 207, 208 and to the D input of flip-flop 204, 206. When either one or the other of the inputs to NAND gate 207, 208 are low, the output is high and is applied to the inputs of positive NAND gate/negative OR gate 209, resulting in a negative output at NAND gate 209. This will remain negative for so long as the UP and DN signals on the input of positive NAND gate/negative OR gates 201 and 202 are positive because the output of gates 201 and 202 will remain low, causing the Q terminals of flip-flops 203 and 205 to remain low, causing one input of positive NAND gates 207 and 208 to be low, which results in high outputs at NAND gates 207 and 208, resulting in a low outputs for gate 209. When the negative UP pulse of negative OR gate 201 occurs, the output of gate 201 goes high. This high pulse is applied to the D terminal of flip-flop 203 which causes the Q terminal of flip-flop 203 to go high at the next clock edge and the $\bar{Q}$ terminal of flip-flop 204 to go low one clock period later. During this one clock period both of these outputs are high and being applied as inputs to positive NAND gate 207, causing the output of gate 207 to go low, which is then applied as an input to gate 209, causing the output of that gate to go high. Thus a GOTA0 pulse is generated when an UP data signal is received at the input terminals of gate 201. In a similar manner, a GOTA0 pulse will be generated at the output of gate 209 when a DN pulse is received at the input terminals of gate 202. The GOTA0 pulses are applied to the J input terminal of T.I.-type 74-112 flip-flop 211. (The function table of this flip-flop is shown on page 5-34 of the *TTL Data Book for Design Engineers*, Second Edition, by Texas Instruments Incorporated.) According to the function table, the flip-flop is toggled on the falling edge of the clock pulse. When the J input terminal of flip-flop 211 is low (as it is in the absence of a GOTA0 pulse) and the K input terminal of flip-flop 211 is high (as it would be if both of the input signals to NOR gate 210 are low), then the $\bar{Q}$ terminal outputting the RXD+ signal would be high and the Q terminal outputting the RXD− signal would be low. By referring to FIG. 5, the RXC is high for the first 8 ticks of a clock cycle and low for the next 8 ticks of the cycle.

Figure 5:
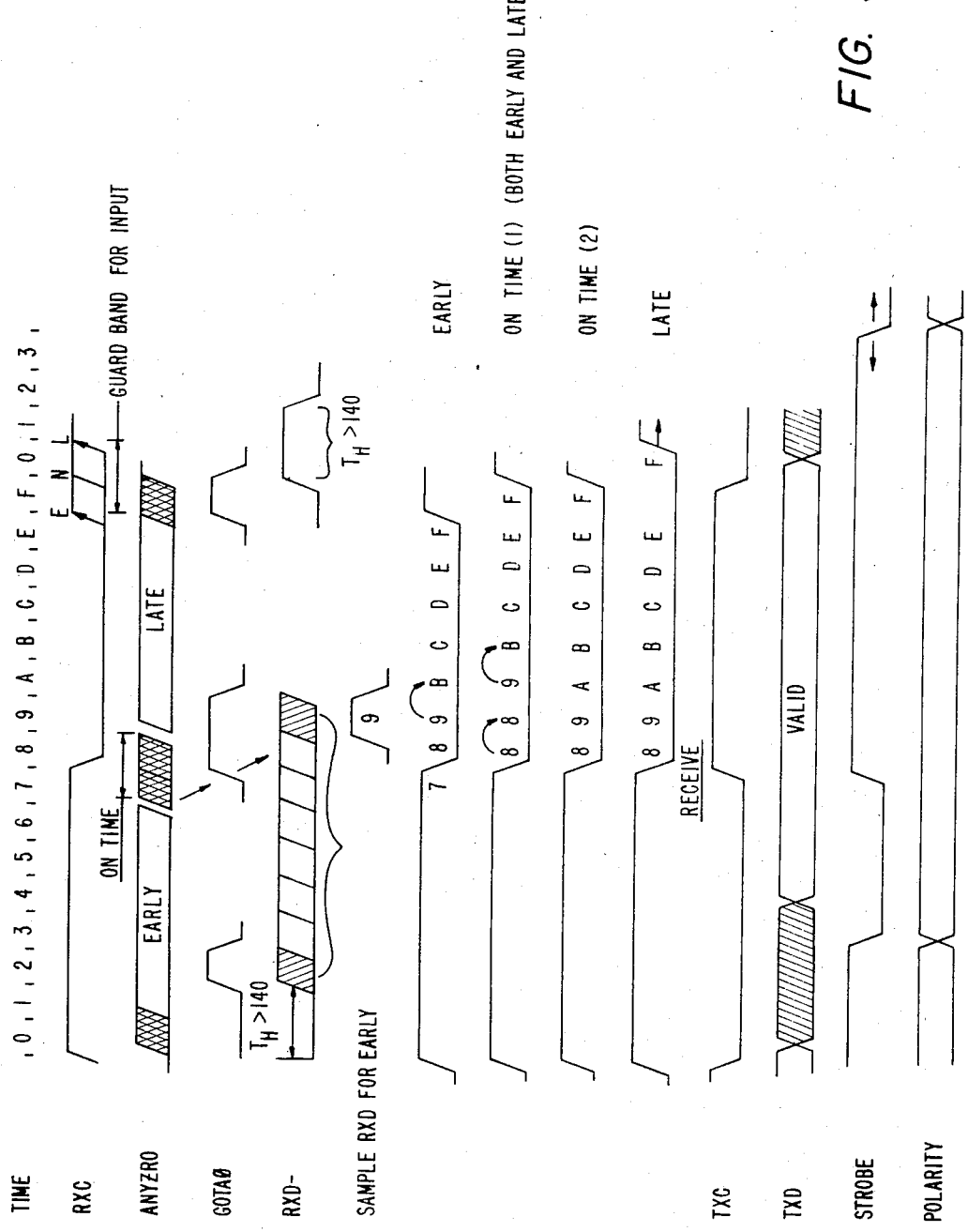
FIG. 5 are timing diagrams utilized in timing the invention.

It will be noted by referring to the timing diagrams of FIG. 5 that a GOTA0 pulse can be received early, on time, or late when compared to the TXC and ANYZR0 timing diagrams. Accordingly when the GOTA0 signal is generated early, the J input of flip-flop 211 is high, the TXC+ signal (which is the inverse of the RXC signal) is low, but the TIM1R9 input is high (except at TIME 01) and accordingly the output of NAND gate 210 is low and is applied to the K input terminal of flip-flop 211. Thus the falling edge of the 16 times clock will set flip-flop 211. The RXD− signal on Q output terminal of flip-flop 211 is now high; whereas the RXD+ signal on the $\bar{Q}$ terminal of flip-flop 211 is low for a DATA ZERO. This condition is also shown on the RXD− timing chart of FIG. 5. By similar reasoning, when the GOTA0 signal occurs late, the RXD− signal will be high.

Referring now to FIG. 3, the synchronizing operation will be described when the GOTA0 signal occurs early or late in the clock cycle. As explained supra, the clock and data signals are generated at 750 kilohertz. On the other hand, the counter 300 is clocked at 16 times clock, of 12 megahertz. The high order terminal $Q_d$ (MSB) of the counter serves as a transmit clock TXC+; whereas the negation of the transmit clock serves as the receive clock RXC+.

In Receive mode, with signal RTS− at a high level, NAND gate 301 serves to withhold one count pulse from counter 300 whenever the GOTA0 pulse occurs during the second half of a bit time. This is accomplished by its driving the count enable input (T) of counter 300 low for one 1/16th bit time interval if the signal GOTA0+ occurs while TXC+ is high (recall that TXC+ is high for exactly the second half of the bit interval; i.e. from TIME 08 through TIME 15). Thus, whichever state (with the exception of TIME 09—see below) counter 300 is in when a GOTA0 pulse occurs, during the second half of the bit period it will last for 2/16th bit time rather than 1/16th bit time and the clock is extended by 1/16th bit time. Gates 303 and 304 serve both to hold counter 300 in the proper initial state under the idle condition (no data pulses received) as well as to adjust the counter state upon reception of an early GOTA0 (one occurring in the first half of bit interval). If no data is being received, then signal DCD+ will be low as described earlier (counter 212 and gate 213). This causes the outputs of both gates 303 and 304 to be high. These together with the high on signal RTS− (since we're discussing Receive mode) cause the output of gate 302 to be a steady low. This being applied to the L input of counter 300 causes it to be in parallel-load mode. In this condition the binary values appearing at its D, C, B, and A inputs are copied into the counter on each positive edge of the 16 times clock. Since no data pulses are being received, signal RXD− is low (data-=ONE) and the binary number appearing at D, C, B and A is 1010 or ten decimal. Thus counter 300 remains in state TIME 10 until the first ZERO bit is received. After the first ZERO bit has been received and signal DCD+ is high, then the output of gate 304 is low when signal RXC+ is high; i.e., for TIME 00 through TIME 07 while the output of gate 303 is low except during TIME 01 and TIME 09. Thus only during TIME 09 are all of the inputs to gate 302 high (recall that signal RTS− is high during Receive mode). Thus, the output of gate 302 goes low at every TIME 09 during Receive mode once the first ZERO bit has been received, because gate 302 is connected to the P and L inputs of counter 300, it causes it to perform a parallel-load operation at every TIME 09 and to count at all other times (unless inhibited by gate 301 via the T input as described earlier). The value that is loaded into the counter depends upon the state of signal RXD−. If no data pulse has been received by the end of TIME 08 (so that it can be sampled in TIME 09), then signal RXD− is low and a value of ten is loaded as in the idle state above. If, on the other hand, a data pulse has been received, then signal RXD− will be high, a value of eleven will be loaded, state TIME 10 will be omitted, and the clock signal will be contracted by 1/16th bit time.

It is to be noted that the count inhibiting action of gate 301 is nullified if the GOTA0 pulse occurs in either TIME 08 or TIME 09. In the former case, the inhibit does take place but because the GATA0 is received in time, TIME 10 is omitted as described earlier. In this case, the GOTA0 pulse is actually detected by both the early pulse circuitry (gates 303, 304 and the presence of RXD− on the A input of counter 300) as well as the late pulse circuitry (gate 301) so that the counter sequence becomes— . . . , 7, 8, 8, 9, 11,—and the total duration (and symmetry) of the clock is not affected. In the case where the signal GOTA0 occurs during TIME 09, gate 301 can have no effect due to the L input of counter 300 being driven low by gates 302, 303 and 304 and the fact that parallel-loading takes precedence over counting on the type 74X161 counter. Thus, there is a 2/16th bit time "dead-band" consisting of TIME 08 and TIME 09 with respect to the occurrence of GOTA0 during which the detection of an input pulse will cause no adjustment. At the other extreme, late pulses must occur by the end of TIME 14 so that GOTA0 occurs in TIME 15 and RXD+ goes low at the end of TIME 15 (this is nominally coincident with the active transition of RXC and suitable safeguards are employed to prevent the transition of RXD from being after the RXC transition of the SIO). Also, GOTA0 pulses which occur during TIME 00 or TIME 01 must be considered invalid due to the action of gate 210 and also at high data rates of the hold time requirement of the SIO (140 nanoseconds). Thus, we have a symmetrical arrangement with a dead-band and a guard-band each of 2/16ths bit time during and separated from each other by two active regions of 6/16ths bit time duration.

Having shown and described a preferred embodiment of the invention, those skilled in the art will realize that many variations and modifications may be made to affect the described invention and still be within the scope of the claimed invention. Thus, many of the elements will provide the same results and fall within the spirit of the claimed invention. It is the intention, therefore, to limit the invention only as indicated by the scope of the claims.

What is claimed is:

1. An apparatus used in the transmission of electronic data pulses indicative of logic ZEROs and logic ONEs wherein a logic ZERO is represented by either a positive or negative pulse, the pulse being positive when the prior pulse encoded in negative and the pulse being negative when the prior pulse is positive, and wherein a logic ONE is represented by the absence of a pulse, said apparatus converting input data signals wherein a logic zero signal indicates a binary zero and a logic one signal indicates a binary one to a strobe pulse signal and a polarity signal and converting the strobe pulse signal and the polarity signal to said electronic data pulses, the apparatus, for generating the strobe pulse signal and the polarity signal, comprising:
   (a) first means comprising a first flip-flop, an input logic circuit and a reset logic circuit, the input logic circuit having an input terminal which receives a serial stream of said input data signals, said input logic circuit setting the first flip-flop for generating said strobe pulse responsive to each logic ZERO signal received at the input terminal and the reset logic resetting the first flip-flop to end each strobe pulse; and,
   (b) second means coupled to said first means and having an input terminal for receiving a serial stream of said strobe pulses for generating said polarity signal for alternate strobe pulses of said serial stream of said strobe pulses the second means comprising a second flip-flop which receives each strobe pulse directly as an input, alternate strobe pulses setting and resetting the second flip-flop such that the output of the second flip-flop reverses state with every strobe pulse.

2. The apparatus as recited in claim 1 wherein said first means comprises first and second NAND gates and the first flip-flop coupled to said first and second NAND gates.

3. An apparatus for receiving an encoded logic ZERO in the form of a first positive pulse signal and transferring that first positive pulse signal into a second positive electronic pulse signal and a positive polarity signal, said apparatus comprising:
   (a) a first NAND gate and a first flip-flop, an output terminal of said first NAND gate coupled to a first input terminal of said first flip-flop; and,
   (b) a second NAND gate and a second flip-flop, an output terminal of said second NAND gate being coupled to a second input terminal of said first flip-flop, and an output terminal of said first flip-flop being coupled to an input terminal of said second flip-flop;
   whereby said first NAND gate produces a first positive output when a data signal applied to an input terminal of said first NAND gate is false (ZERO) and said second NAND gate is responsive to a clock signal applied to an input terminal of said second NAND gate to set said first flip-flop, whereby said second flip-flop is toggled to generate said positive polarity signal.

4. The apparatus as recited in claim 2 including a third NAND gate coupled to said second NAND gate and to said first flip-flop.

5. An apparatus for receiving an encoded logic ZERO in the form of a negative pulse signal and transferring that negative pulse signal into a positive electronic pulse signal and a negative polarity signal, said apparatus comprising:
   (a) a first NAND gate and a first flip-flop, an output terminal of said first NAND gate coupled to a first input terminal of said first flip-flop; and,
   (b) a second NAND gate and a second flip-flop, an output terminal of said second NAND gate being coupled to a second input terminal of said first flip-flop, and an output terminal of said first flip-flop being coupled to an input terminal of said second flip-flop;
   whereby said first NAND gate produces a positive output when a send data signal applied to an input terminal of said first NAND gate is false (ZERO) and sets the first flip-flop, and whereas said second NAND gate is responsive to a clock signal applied to an input terminal of said second NAND gate for resetting said first flip-flop, and whereby said second flip-flop is toggled to produce said negative polarity signal.

* * * * *